United States Patent Office 3,471,617
Patented Oct. 7, 1969

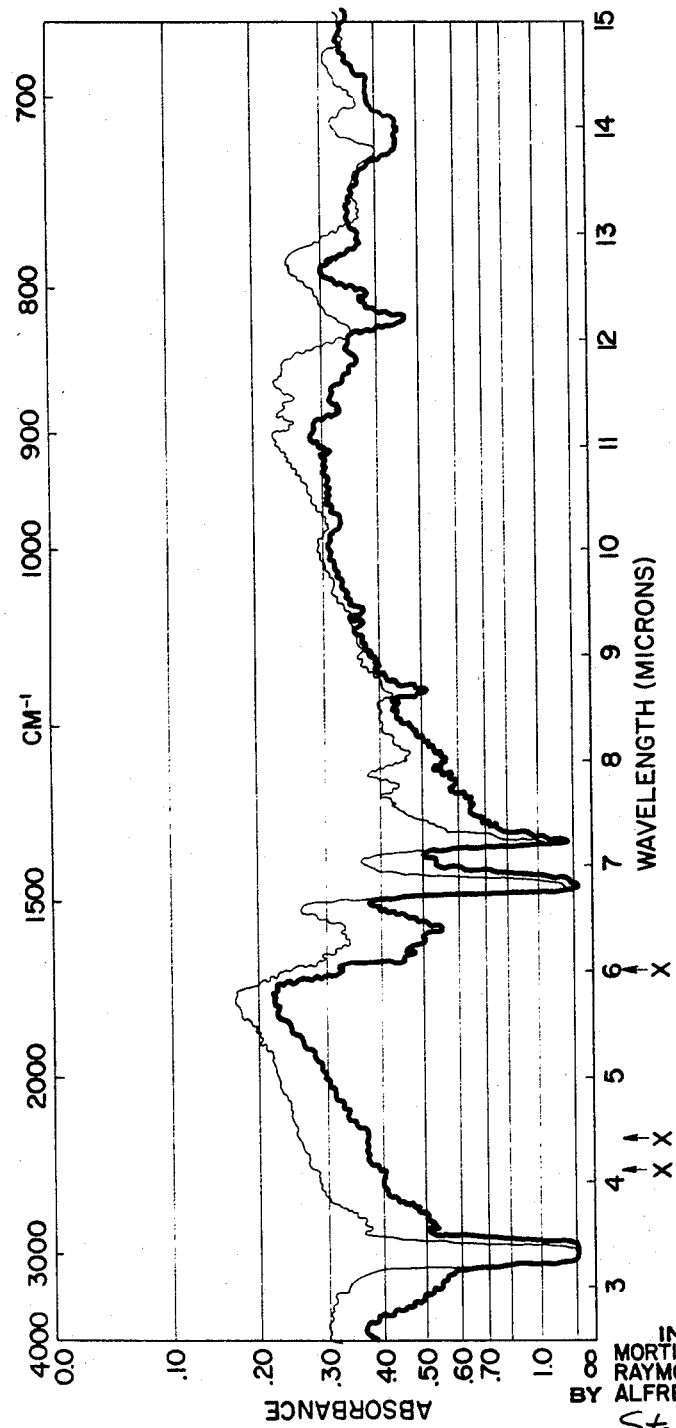

3,471,617
PHARMACEUTICAL COMPOSITIONS OF AMMONIATED MERCURY SALICYLATE AND METHODS FOR THEIR USE
Alfred Halpern, Great Neck, Mortimer D. Sackler, New York, and Raymond R. Sackler, Roslyn, N.Y., assignors to Mortimer D. Sackler & Raymond R. Sackler, Yonkers, N.Y., a copartnership
Continuation of application Ser. No. 384,340, July 22, 1964. This application Oct. 5, 1967, Ser. No. 675,749
Int. Cl. A61k 27/00
U.S. Cl. 424—230                    14 Claims

ABSTRACT OF THE DISCLOSURE

Pharmaceutical compositions of ammoniated mercury salicylate useful for the treatment of dermatologic complaints, and to render a surface free of microbial contamination.

---

This application is a continuation application of applicant's co-pending United States Patent application, Ser. No. 384,340, filed July 22, 1964 and has now matured into U.S. Patent No. 3,360,535.

This invention relates to a new and novel mercury compound, methods for its preparation and methods for its use in the therapy of humans and animals. In particular, it is concerned with ammoniated mercury salicylate, its method of preparation and its use in therapy.

Mercury compounds have been used for centuries as a therapeutic agent to combat a wide variety of pathologic manifestations. These have ranged from serious systemic infectious diseases such as syphilis and gonorrhea, as well as dermatologic complaints, such as psoriasis and impetigo, to the use in cosmetics as a freckle-bleaching skin cream and also as a general germicide and disinfectant. These preparations all involve a common limitation of mercury toxicity, and consequently, many attempts have been made to prepare a compound having the beneficial therapeutic properties of mercury without its high toxicity.

One such attempt at reduced toxicity has been to change the solubility of the mercury compounds and thereby reduce its overall toxicity. Thus, we find that bichloride of mercury, a highly toxic chemical, is rendered into a comparatively safe therapeutic compound by changing its solubility in the form of mercurous chloride or calomel. It should be noted, however, that the overall pharmacologic activity of the compound is similarly reduced quantitatively although it remains the same qualitatively, by this technique.

Another approach to reduce toxicity has been to form the ammonia derivatives or the ammoniated compounds of mercury, of which three basic types or classes exist. The first group consists of additive compounds such as $HgCl_2 \cdot @NH_3$ or te so-called fusible white precipitate; the second group is the ammonolyzed compounds in which the acid radical of the mercuric salt is in part replaced by $NH_2$, $NH$ or $N$ and thirdly, the group of compounds which are both hydrolyzed and ammonolyzed. The compounds of the first group are formed when the soluble mercuric salt as for example, mercuric chloride, is slowly added to a hot mixture of ammonium hydroxide and ammonium chloride and the additive compound, $HgCl_2 \cdot 2NH_3$ is formed. If ammonium hydroxide is added to a solution of mercuric chloride, an example of the second group, the ammonolyzed compounds, is obtained. The third group of ammoniated compounds is obtained when ammonia is added to an alkaline double mercuric salt, as for example, Nessler's reagent, $K_2Hg Cl_4$. The most widely used ammoniated mercury compound in therapy is that which is known as Ammoniated Mercury, U.S.P., or "White Precipitate" and has the general formula, $NH_2HgCl$.

While ammoniated mercury has as a predominant use the treatment of certain dermatologic disease, it does have, in addition, general antiseptic and germicidal properties. Its usefulness, however, is limited by its toxicity, irritation to tissue and that it is capable of eliciting allergic reactions. It has been suggested in the literature that the keratolytic action of salicylic acid is of value in facilitating the dermatologic response of ammoniated mercury since this compound has been shown to be less absorable through the skin than other compounds of mercury. The use of salicylic acid, in this manner, however, has been shown by some investigators to seriously modify the toxicologic responses of ammoniated mercury and that unless certain critical ratios of the amount of the mercury compound to the salicylic acid is observed, the irritating, toxic potential of the ammoniated mercury compound is either increased or reduced. Thus, it was demonstrated that the mixture of ammoniated mercury and salicylic acid is more irritating than the ammoniated mercury alone. It was also demonstrated that only where a large excess of ammoniated mercury is present, so that ammonium chloride and the conventional mercuric salicylate is formed, that the toxicity is reduced and the products are less irritating to the skin. This latter response is explained entirely on the basis of the double decomposition which has taken place to form the separate ammonium chloride and mercury salicylate. However, the therapeutic effectiveness of the formed mixture of mercury salicylate and ammonium chloride is not as desirable as that of ammoniated mercury or the mixture of ammoniated mercury and salicylic acid, and is in fact, reduced.

It was found that by reacting mercuric salicylate with ammonia, a new and novel compound, ammoniated mercury salicylate, results, which is less irritating than the older known ammoniated mercury chloride and has a more favorable dermato-therapeutic action than does ammoniated mercury chloride. Furthermore, this new compound has broad germicidal and anti-septic properties which makes it highly desirable for use as an agent to combat infection as well as to render objects and materials free of microbial contamination.

The new compound, ammoniated mercury salicylate, is obtained by reacting mercury salicylate with ammonia and recovery the insoluble white compound which is formed. In carrying out this reaction, a suspension of mercury salicylate is prepared in an aqueous media and to this is added approximately 5 molar volumes of ammonia and the whole allowed to stand at room temperature for a period of at least 1 hour. The material is then filtered, washed with cold water and dried. The compound has a mercury analysis of 56.3 percent; a salicylate content of 35.3 percent and an ammonia content of 4.4 percent, calculated by the Kjeldahl method. The amount of ammonia necessary to react will be at least 1 mol for each mol of mercury salicylate used, with the preferred reaction ratio of 5 mols of ammonia for each mol of mercury salicylate used. The solvent for the reaction may be either water or aqueous alcohol mixtures, containing from 10 to 40 percent of a liquid aliphatic alchol, having from 1 to 5 carbons. The compound is obtained as a white powder, which darkens on exposure to light and is insoluble in water, alcohol and most organic solvents. On warming with dilute acid, it is decomposed into free salicylic acid and the ammonium and mercury salts of the acidolyzing ion is used. Similarly, strong alkali will decompose the compound into the conventional mercury oxide, the alkali salt of salicylic acid and free ammonia. On heating the compound at temperatures over 75° C. for periods of time, ammonia will be given off and the compound will revert to mercury salicylate. However, under the usual conditions of storage, in a dry container, protected from light, the compound is stable. The new compound has a characteristic infrared spectrum which demonstrates not only its chemical composition but also the distinguishing characteristics between the new compound and the conventional mercury derivatives.

FIGURE 1 illustrates the comparative infra-red spectra obtained as a nujol mull of the new compound, ammoniated mercury salicylate (curve A) and that of the conventional mercury salicylate (curve B). The infra-red spectra described clearly establishes the difference between these two molecules as well as the particular characteristics of the new molecule.

The infra-red spectrum for ammoniated mercury salicylate has a predominant peak at 12.2 microns and also characteristic peaks at 4.1, 4.4, and 6.0 microns. These latter peaks, viz., 4.1, 4.4 and 6.0 microns confirm the presence of ammonia within the molecule while the peaks commonly identified with that of a free phenol group or a carboxyl group, are notably absent, thus establishing the chelate character of this new molecule.

Ammoniated mercury salicylate may also be prepared by reacting ammoniated mercury ($NH_2HgCl$) with sodium salicylate in a neutral, inert medium. The reaction takes place preferably at room temperature over a period of at least 6 hours. The insoluble material is then filtered and washed with cold water, dried and is ammoniated mercury salicylate.

Still another procedure for the preparation of ammoniated mercury salicylate is to react ammoniated mercury ($NH_2HgCl$) with salicylic acid in an alkaline medium. The pH of the reaction is at least pH 8.5 with a preferred pH of between pH 9.5 and pH 10.5. This alkaline pH may be achieved by the use of sufficient soluble metal hydroxides, such as sodium hydroxide and potassium hydroxide, or insoluble metal hydroxides, such as calcium hydroxide and magnesium hydroxide, or the alkali metal carbonates and bicarbonates. The ammoniated mercury salicylate is recovered from the mixture as a white powder.

When used in therapy the new compound may be administered in the form of a powder, a suspension, a solution or an ointment. The effective therapeutic concentration of the ammoniated mercury salicylate may range from 0.1 percent to 10 percent by weight, depending upon the particular use for which the preparation is desired, as well as the specific needs of the patient. Generally a preparation containing from 0.1 percent to 0.5 percent of active ingredient will be found satisfactory for use in treating the milder skin lesions, while a preparation containing from 1 percent to 10 percent of active ingredient will be required for the more resistant or the more severe lesions.

When a powder dose form is preferred, then the ammoniated mercury salicylate is dispersed in a pharmaceutically acceptable carrier, such as talc, kaolin, or magnesium carbonate, in a ratio of from 0.1 percent to 10 percent by weight of the active ingredient, with the remainder being the carrier. A suspension may be prepared using an aqueous or hydro-alcoholic vehicle by utilizing a micronized or finely divided powder of ammoniated mercury salicylate and suspending this in the vehicle with the aid of the usual suspending agents, such as the fatty acid esters of sorbitol. Such solvents as water, ethanol, isopropanol, glycerin, propylene glycol and mixtures of these may be used as a vehicle. When the ethanol or isopropanol is used in combination with water as the vehicle, the concentration of the alcohol may range from 5 percent to 25 percent by volume. When glycerin and propylene glycol are used in combination with water as the vehicle, then the concentration of these former agents may range from 10 percent to 25 percent by volume.

Should it be desired to prepare a lotion, then either an oil-in-water or a water-in-oil emulsion system may be used. A bland vegetable oil is preferred and such oils as peanut oil, olive oil and cottonseed oil may be used. It is preferred that a non-ionic emulsifying agent be utilized to form the emulsion. Ointments containing the active ingredient may be prepared with the use of any of the pharmaceutically acceptable ointment bases, or if it is preferred, then petrolatum alone may be used.

Should it be desired to prepare a solution for purposes of sterilizing instruments or for irrigating a wound, then the active ingredient is dissolved in sufficient water to form a solution containing 1 part ammoniated mercury salicylate in a thousand parts of water. More dilute solutions may be used, depending upon the type of substance to be rendered a septic and the nature of the contaminating organism. The solutions of ammoniated mercury salicylate are effective against bacteria, fungus and yeast infections and have the ability to kill these organisms on contact. While a solution is a preferred means for achieving this antiseptic and germicidal effect, any of the other dosage forms may similarly be utilized for this purpose.

Ammoniated mercury salicylate has a particular range of effectiveness in combating the dermatologic lesion known as psoriasis. When used for the treatment of psoriasis, the effective concentration of the drug ranges from 0.1 percent to 10 percent of the active ingredient, depending upon the extent of diseased tissue involved and the severity of the pathologic process.

Thus, the chronic, more resistant and generalized dermatologic lesion will require a greater concentration of the active compound to be effective, whereas the milder, localized lesion will respond to a lowered concentration.

The following examples illustrate the scope of this invention.

Example 1

To a suspension of 16.9 gm. of mercury salicylate in 250 ml. of water contained in a suitable vessel which is capable of being sealed, is added 25 ml. of ammonium hydroxide solution containing 28 percent ammonia by weight. The container is sealed and the mixture is stirred for at least 1 hour at room temperature, after which time the insoluble material is filtered and washed twice with small portions of cold water and dried. The powder is then finely divided and once again washed with cold water and dried in vacuum. The compound obtained is ammoniated mercury salicylate and has a mercury content of 56.3 percent, a salicylate content of 35.3 percent and an ammonia content of 4.4 percent when calculated by the Kjeldahl method.

Ammoniated mercury salicylate is a white powder which darkens on exposure to light and is soluble in water to the extent of 0.3 percent. On warming with dilute acide, it is decomposed into free salicylic acid and the ammonium and mercury salts of acidolyzing ion used. When treated with sodium hydroxide, the compound decomposes into sodium salicylate, free ammonia and mercuric oxide. On heating ammoniated mercury salicylate at temperatures above 75° C., ammonia is given off.

The infra-red spectrum for ammoniated mercury salicylate has a predominant peak at 12.2 microns and characteristic peaks at 4.1, 4.4 and 6.0 microns. The peaks commonly associated with that of a free phenol group or a carboxyl group are absent. The compound is stable under the usual conditions of storage when protected from light.

Example 2

When it is desired to utilize ammoniated mercury salicylate in therapy, it may be administered in the form of a powder, a suspension, a lotion or an ointment. The effective therapeutic concentration of ammoniated mercury salicylate in these preparations may range from 0.1 percent to 10 percent by weight, depending on the particular use for which the preparation is desired, as well as the specific needs of the patient.

To prepare a powder: 3 gm. of ammoniated mercury salicylate is ground in a motar with 3 gm. of talc. To this mixture is added 30 gm. of talc and the whole intimately blended. This concentrated base powder is then blended with additional talc as a diluent to provide 1 kilogram of powder. The blending must be thorough and uniform. Should it be preferred to add a milling lubricant, such as magnesium stearate, then this may be added in quantities not exceeding 0.5 percent. The concentration of active ingredient in the powder thus prepared, is 0.3 percent by weight. Should it be desired to utilize other pharmaceutically acceptable powder vehicles, such as magnesium carbonate, magnesium oxide or magnesium stearate, then these may be substituted, wholly or in part, for the adidtional talc diluent added to the base powder, in the preparation of the powder formulation. The range in concentration of the active ingredient in the powder is from 0.1 percent to 10 percent by weight, with the remainder being powder vehicle.

To prepare a suspension: Suspensions of ammoniated mercury salicylate in distilled water, are prepared by utilizing a micronized powder of ammoniated mercury salicylate, which has an average particle size not larger than 0.5 micron and using an homogenizer to prepare the dispersion. When larger particle size powdered ammoniated mercury salicylate is used, then suspending agents, such as are well known in the art, as for example, the fatty acid esters of sorbitol, which are known in commerce as "Spans" and "Tweens," may be used. Should a hydro-alcoholic solvent be desired as a vehicle for the suspension, then ethanol or isopropanol may be substituted for part of the water, to provide a vehicle having from 5 to 25 percent by volume of the alcohol, the remainder being water. The remainder of the steps in the preparation being the same.

If a polyhydroxy alcohol is desired to be included in the vehicle, then glycerin, or propylene alcohol or sorbitol may be used and these agents may replace part of the water in either the aqueous or the hydro-alcohol vehicle. The concentration of the polyhydroxy component may range from 10 to 50 percent by volume.

To prepare a lotion: any of the conventional oil-and-water, or water-in-oil systems may be used. An example of a suitable oil-in-water vehicle is to emulsify 50 parts of cottonseed oil in 200 parts of distilled water, using 3 percent of polyoxyethylene sorbitan sesquioleate as the non-ionic emulsifying agent. The active component, ammoniated mercury salicylate, may be added either to the oil phase during the emulsification process or to the completed emulsion. When added to the completed emulsion, homogenization is a preferred method of suspending the active ingredient. The range in concentration of active ingredient in a lotion is from 1 percent to 10 percent by weight.

Should a water-in-oil emulsion be desired, then 10 parts of water are emulsified with 25 parts of light mineral oil, utilizing 2 percent of sorbitan mono-oleate as the non-ionic emulsifying agent. The active ingredient may be added directly to the oil phase during the emulsification process or added to the finished lotion. The conventional methods of dispersing the active ingredient in a liquid preparation are utilized to achieve a uniform dispersion. In preparing a lotion, a non-ionic emulsifying agent is preferred, although this is not a critical necessity.

To prepare an ointment: petrolatum U.S.P. may be used as the ointment base. Hydrophilic petrolatum, U.S.P. cold cream or a vanishing cream (oil-in-water emulsion base) may also be used as ointment vehicles. The active ingredient is suspended in the ointment base so that it is present in a concentration of from 0.1 percent to 10 percent by weight. The active ingredient is dispersed by means of levigation or milling, dependent upon the size of the batch being worked with.

The pharmaceutical preparations described above are stable and may be used in therapy for applying to the affected area from 1 to 6 times daily. The preparation should be gently applied to the skin lesion and loosely covered when necessary.

Example 3

To prepare a solution of purposes of rendering a surface free of microbial contamination, ammoniated mercury salicylate is dispersed in distilled water to prepare a saturated solution. The solubility of the ammoniated mercury salicylate is 33 mg per 100 cc. of water, which concentration is in excess of that required for effective anti-microbial activity. A solution of 1 part in 1000 parts of solution is sufficient as an antiseptic agent for virtually all microbial contaminants, and solutions as dilute as 1 part in 25,000 parts of solution may be used in specific instances. To prepare a solution of desired strength, a saturated solution of the active ingredient is diluted to the concentration required with additional distilled water. This solution may be utilized as a wet dressing, and a soak. The solution may also be added to detergents for an antiseptic cleansing bath for instruments, laundry, or any other general cleansing purposes wherein antiseptic activity is desired. Thus, when it is desired as a rinse for diapers, a sufficient quantity of the concentrated solution, ammoniated mercury salicylate, is added to the rinse water to provide an antiseptic medium, having a range in concentration of active ingredient of from 1 part in 1000 parts of solution to 1 part in 25,000 parts of solution.

Example 4

When it is desired to utilize ammoniated mercury salicylate in the treatment of psoriasis, then the compound may be used in any of the pharmaceutically acceptable dosage forms, such as powders, suspensions, lotions or ointments. The range in concentration of the active ingredient in these preparations may be from 0.1 percent to 10 percent by weight, dependent upon the particular patient needs. A preparation containing from 0.1 percent to 0.5 percent of the active ingredient will usually be adequate for treating the milder forms of this disease, while the higher concentrations are utilized for the more severe manifestations. The preparation is applied to the affected area from 1 to 6 times daily, and symptomatic relief will generally be experienced within the first 24 hours after the institution of therapy.

What is claimed is:

1. A pharmaceutical composition comprising a pharmaceutically acceptable carrier and from 0.1 percent to 10 percent by weight of ammoniated mercury salicylate.

2. A pharmaceutical composition of claim 1 comprising from 0.1 percent to 10 percent by weight of ammoniated mercury salicylate and a carrier selected from the group consisting of talc, magnesium carbonate, magnesium oxide, magnesium stearate and mixtures of the same.

3. A pharmaceutical composition of claim 1, being a pharmaceutically acceptable suspension comprising from 0.1 to 10 percent by weight of ammoniated mercury salicylate and a pharmaceutically acceptable carrier selected from the group consisting of water, liquid alkanols having a chain length of from 1 through 5 carbons, glycerin, propylene glycol, sorbitol and mixtures of the same.

4. A pharmaceutical composition of claim 1, being a lotion comprising from 0.1 to 10 percent by weight of ammoniated mercury salicylate in a pharmaceutically acceptable liquid emulsion.

5. A pharmaceutical composition of claim 1, being a solution comprising from 0.1 percent by weight of ammoniated mercury salicylate in an inert solvent.

6. The method of treating a dermatologic disorder comprising the step of applying a pharmaceutical composition comprising a pharmaceutically acceptable carrier and from 0.1 to 10 percent by weight of ammoniated mercury salicylate to the affected area.

7. The method of claim 6 for treating psoriasis comprising the step of applying ammoniated mercury salicylate to the affected area.

8. The method of claim 6 for treating psoriasis comprising the step of applying a pharmaceutical composition comprising a pharmaceutically acceptable carrier and from 0.1 to 10 percent by weight of ammoniated mercury salicylate to the affected area.

9. The method of reducing the microbial contamination of a surface which comprises the step of contacting the surface with a solution of ammoniated mercury salicylate.

10. The method of claim 9 for reducing the microbial contamination of a surface which comprises the step of contacting the surface with a solution containing from 0.001 percent to 0.3 percent by weight of ammoniated mercury salicylate.

11. The method of reducing the microbial contamination of laundered articles which comprises the step of adding to the final rinse water of the laundering process, a solution of ammoniated mercury salicylate.

12. The method of claim 11 for reducing the microbial contamination of laundered articles which comprises the step of adding to the final rinse water of the laundering process, a solution containing from 0.001 percent to 0.3 percent by weight of ammoniated mercury salicylate.

13. The method of claim 11 for reducing the microbial contamination of laundered articles which comprises the step of adding to the final rinse water of the laundering process, ammoniated mercury salicylate, so that the concentration of the ammoniated mercury salicylate in the rinse water is within the range of 0.001 percent to 0.3 percent by weight.

14. The method of treating a dermatologic infection which comprises the steps of applying a wet dressing consisting of a solution of ammoniated mercury salicylate containing from 0.001 percent to 0.3 percent by weight of ammoniated mercury salicylate.

References Cited

UNITED STATES PATENTS

| | | | |
|---|---|---|---|
| 2,479,275 | 8/1949 | Sowa | 167—30 |
| 2,754,241 | 7/1956 | Schwerdle | 167—30 |
| 3,089,811 | 5/1963 | Pugh | 167—30 |
| 1,672,615 | 6/1928 | Kharasch | 260—434 |

OTHER REFERENCES

Lascoff: Jour. Am. Pharm. Assoc., vol. 6, p. 143, 1917.

RICHARD L. HUFF, Primary Examiner